US006931335B2

(12) United States Patent
Mueller

(10) Patent No.: US 6,931,335 B2
(45) Date of Patent: Aug. 16, 2005

(54) JITTER HISTOGRAM APPROXIMATION

(75) Inventor: Marcus Mueller, Stuttgart (DE)

(73) Assignee: Agilent Technologies, Inc., Palo Alto, CA (US)

( * ) Notice: Subject to any disclaimer, the term of this patent is extended or adjusted under 35 U.S.C. 154(b) by 103 days.

(21) Appl. No.: 10/290,594

(22) Filed: Nov. 8, 2002

(65) Prior Publication Data

US 2003/0191592 A1 Oct. 9, 2003

(30) Foreign Application Priority Data

Apr. 5, 2002 (EP) .............................................. 02007690

(51) Int. Cl.$^7$ .......................... H04L 1/20; G06F 101/14
(52) U.S. Cl. ........................... 702/69; 702/66; 702/180; 375/226
(58) Field of Search ............................. 702/57, 58, 66, 702/69, 75, 76, 180, 181, 182, 183, 185; 375/226, 371

(56) References Cited

U.S. PATENT DOCUMENTS

| 4,453,226 | A | * | 6/1984 | Hobbs et al. .................. 702/29 |
| 4,725,968 | A | * | 2/1988 | Baldwin et al. ............. 702/186 |
| 5,452,333 | A | * | 9/1995 | Guo et al. .................... 375/371 |
| 5,612,928 | A | * | 3/1997 | Haley et al. .................. 367/11 |
| 5,638,269 | A | * | 6/1997 | Fournier et al. .............. 702/14 |
| 6,076,175 | A | * | 6/2000 | Drost et al. .................. 714/704 |
| 6,263,103 | B1 | * | 7/2001 | Freeman et al. ............. 382/173 |
| 6,269,062 | B1 | * | 7/2001 | Minemura et al. ........ 369/47.53 |
| 6,298,315 | B1 | * | 10/2001 | Li et al. ....................... 702/180 |
| 6,614,434 | B1 | * | 9/2003 | Finke .......................... 345/440 |
| 6,799,144 | B2 | * | 9/2004 | Li et al. ....................... 702/180 |
| 2002/0188429 | A1 | * | 12/2002 | Martis ......................... 702/189 |
| 2003/0004664 | A1 | * | 1/2003 | Ward et al. ................... 702/69 |
| 2003/0115017 | A1 | * | 6/2003 | Sun et al. .................... 702/181 |
| 2003/0163268 | A1 | * | 8/2003 | Tan et al. ...................... 702/76 |
| 2005/0027477 | A1 | * | 2/2005 | Li et al. ....................... 702/181 |

FOREIGN PATENT DOCUMENTS

| JP | 2000188617 A | * | 7/2000 | ........... H04L/25/02 |
| WO | WO 00/34901 | * | 6/2000 | ........... G06F/17/40 |

OTHER PUBLICATIONS

Li et al., "A New Method for Jitter Decomposition Through Its Distribution Tail Fitting", ITC International Test Conference, pp. 788–794, 1999.*
Li et al., "A New Method for Jitter Decomposition Through Its Distribution Tail Fitting", ITC International Test Conference, pp. 788–794, 1999.*
Roberts et al., "Bayesian Approaches to Gaussian Mixture Modeling", IEEE Transactions on Pattern Analysis and Machine Intelligence, vol. 20, No. 11, Nov. 1998.*
Vlassis et al., "A Kurtosis–Based Dynamic Approach to Gaussian Mixture Modeling", IEEE Transactions on Systems, Man, and Cybernetics–Part A: Systems and Humans, vol. 29, No. 4. Jul. 1999.*
Wolfram Research, "Mathworld", "Gaussian Distribution", "Variance", and "Standard Deviation", http://mathworld-.wolfram.com.*
Hewlett Packard Application Note 1267 "Frequency Agile Jitter Measurement System".

* cited by examiner

Primary Examiner—Marc S. Hoff
Assistant Examiner—Jeffrey R. West

(57) ABSTRACT

For determining a jitter value for a digital data signal, a jitter histogram determined for the digital data signal is substantially approximated using n normal distribution functions. The two outermost normal distribution functions are determine, and the jitter value is derived from a distance between the mean values of the two outmost distribution functions.

13 Claims, 4 Drawing Sheets

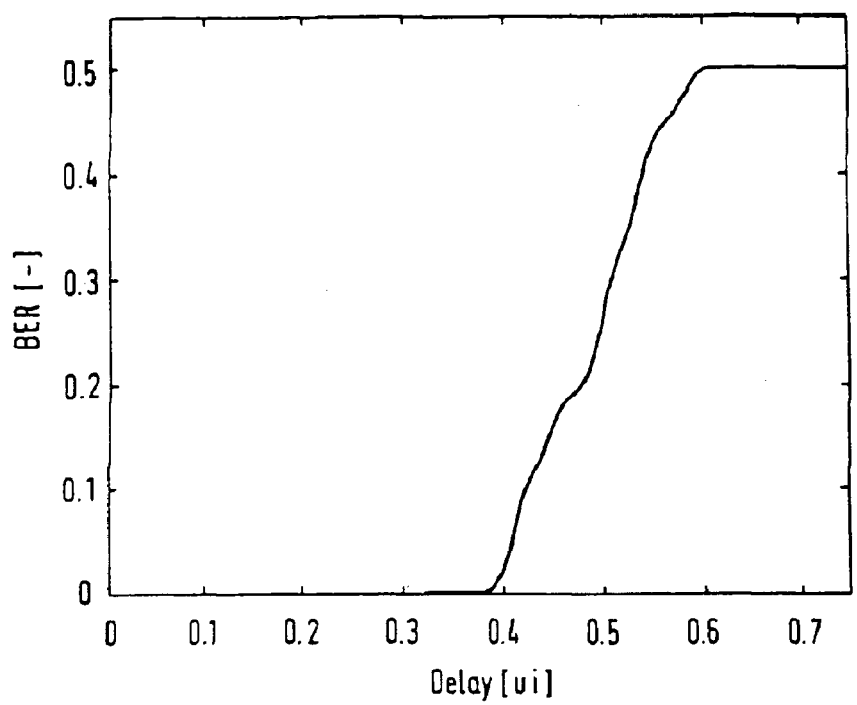
Fig.1 BATHTUB CURVE FOR TEST PATTERN MEASUREMENT
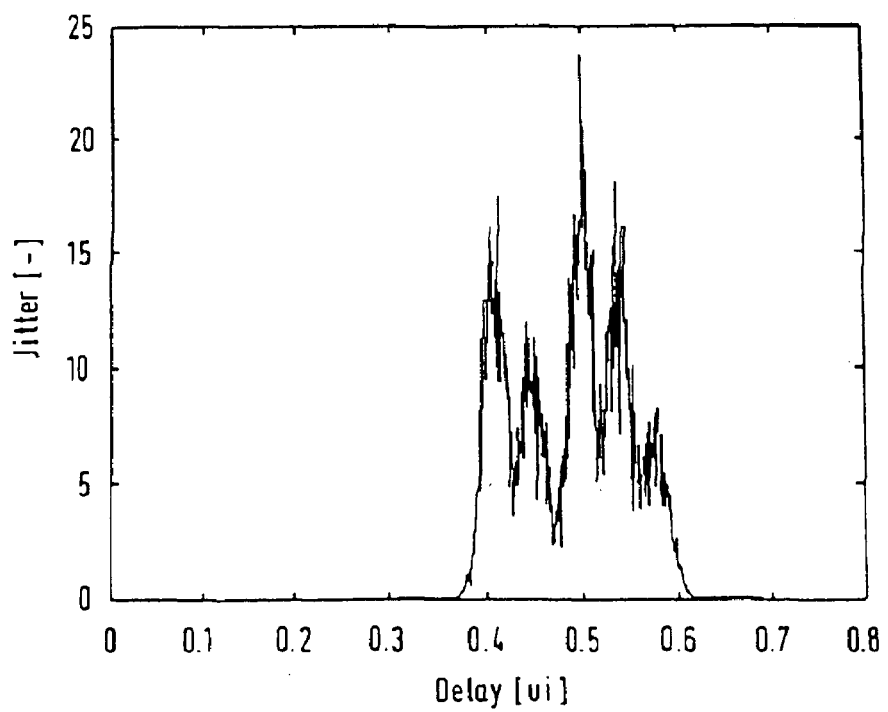
Fig.2 JITTER HISTOGRAM FOR TEST PATTERN MEASUREMENT

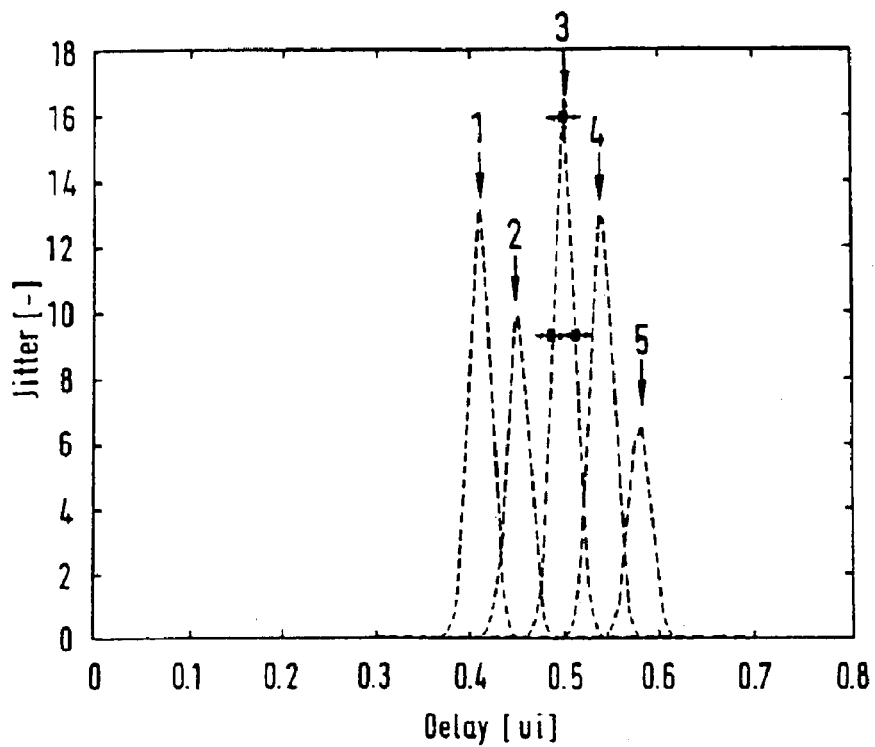
Fig. 3 MULTI-KERNAL GAUSSIAN FIT FOR FIGURE 2
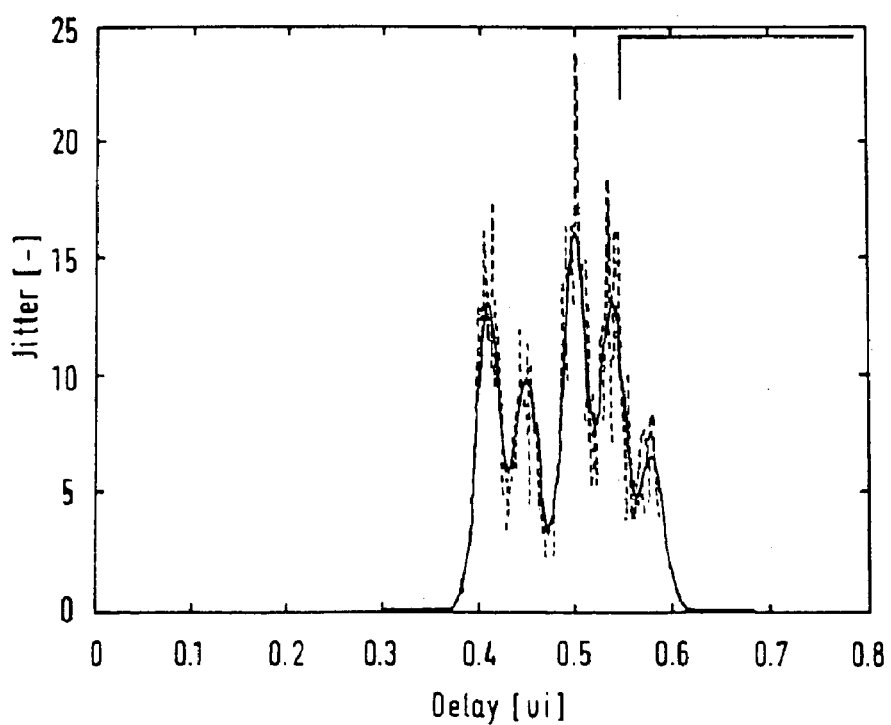
Fig. 4 SUM OF KERNALS OF FIGURE 3 WITH HISTOGRAM OF FIGURE 2

JITTER HISTOGRAM APPROXIMATION

BACKGROUND OF THE INVENTION

The present invention relates to jitter measurements for digital data communication testing.

Characterizing the transient behavior of high-speed digital circuits, i.e. the transition from a logical zero to a logical one and vice versa, has become increasingly important for designing as well as manufacturing such digital circuits. Timing problems can cause single transmission errors, or temporary or even permanent outage of an entire communication system, and have to be avoided. The standard overall figure of merit for a communications system is the Bit Error Rate (BER), however a high value of BER does not necessarily indicate timing problems, as there are many other potential sources of error in a system (for example level/threshold mismatch).

One of the key specifications of high-speed circuits with respect to timing is Jitter. ITU-T G.701 defines jitter as short-term non-cumulative variations of the significant instants of a digital signal from their ideal positions in time. The significant instant can be any convenient, easily identifiable point on the signal such as the rising or falling edge of a pulse or the sampling instant. By plotting the relative displacement in the instants between an ideal pulse train and a real pulse train that has some timing jitter, the so-called jitter function is obtained. In addition to the jitter time function, the jitter spectrum can be displayed in the frequency domain.

Jitter can also be displayed using so-called Jitter-Histograms showing the likelihood for a transition. Jitter Histograms can be measured using a BER Tester, such as the Agilent® 81250 ParBERT® provided by the applicant Agilent Technologies. The histogram values are obtained from a BER vs. Sample Delay measurement (generally referred to as the so-called bathtub curve) by taking the absolute value of the derivative.

More information about jitter is disclosed in the Application Note 1267, "Frequency agile jitter measurement system", 5963-5353E, Apr. 1995, Hewlett-Packard.

SUMMARY OF THE INVENTION

It is an object of the invention to provide an improved jitter measurement. The object is solved by the independent claims. Preferred embodiments are shown by the dependent claims.

The invention makes use of a jitter model wherein jitter (in real-world signals) is generally composed of deterministic and random jitter content. Deterministic jitter (also referred to as data-dependent jitter) is bounded in amplitude and has specific causes (e.g. Duty Cycle Distortion, Inter Symbol Interference, etc.). Random jitter is unbounded and caused by data-independent effects, such as thermal noise etc. Further in this model, purely random jitter (i.e. jitter with only random jitter content) can be assumed to be normally (Gaussian) distributed, and can thus be described by a single number, the "root mean square" (RMS) value, also known as "standard deviation". Deterministic jitter—in contrast thereto—can be fully described only by a list of all its components, with both a relative timing and a relative probability value at each component.

A jitter histogram is determined for a digital data signal to be measured, which can be e.g. a 'real-life' data signal or a standardized test pattern (such as a pseudo random binary stream PRBS, a worst case jitter pattern, etc.). According to the present invention, the determined jitter histogram is then substantially approximated (or fitted) using n (with n=2, 3, 4, . . . , N) normal (Gaussian) distribution functions. Each distribution function is characterized by a mean value $M_n$, a standard deviation $\sigma_n$ (both e.g. in units of time [s] or as fractions of a system period/unit interval [ui]), and a relative, dimensionless weight value.

A jitter value for the measured data signal is then derived by determining the distance between the mean values of the two outermost distribution functions. Thus, the jitter value represents the deterministic jitter proportion of the measured data signal, since according to the underlying model jitter is expected to appear as substantially discrete lines resulting from the data-dependent or deterministic jitter, with each line being 'broadened' by the random jitter contribution to a respective normal (Gaussian) distribution function. The mean value of the approximated standard distributions might further be determined and has been found to provide a reasonable estimate for the random jitter.

The determined jitter value (representing the deterministic jitter proportion of the measured data signal) and/or the random jitter estimate (received from the mean value determined for the approximated standard distributions) is preferably applied for quick pass/fail testing of devices. Preferably, the device is regarded to fail the test, if at least one of the determined jitter value and the random jitter estimate exceeds a given respective threshold value. The full histogram fit data may be further used to investigate e.g. root causes of data jitter in the communication systems.

In a preferred embodiment, the jitter histogram is approximated using known fitting algorithms such as least squares. Special care has to be exercised when determining the number of kernels in the approximation, and reasonable fit quality is to be balanced with over-fitting of noise in the measured data. This can be achieved e.g. using analytical methods such as Bayesian or Kurtosis-based approaches to Gaussian Mixture Modeling, or employing artificial intelligence techniques such as Fuzzy Logic or Genetic Algorithms. The fit quality can be further improved by making use of prior knowledge, such as typical random jitter values for a device or type of device or jitter information derived from other jitter analysis algorithms (e.g. as disclosed in the pending European patent applications No. 02006259.2 by the same applicant). More detailed information on the aforementioned techniques can be found e.g. in the following papers:

"Bayesian Approaches to Gaussian Mixture Modeling", Stephen J Roberts, Dirk Husmeier et al, IEEE Transactions on Pattern Analysis and Machine Intelligence, Vol. 20, No. 11, November 1998

"A Kurtosis-Based Dynamic Approach to Gaussian Mixture Modeling", Nikos Vlassis and Aristidis Likas, IEEE Transactions on Systems, Man, and Cybernetics, Vol. 29, No. 4, July 1999

"Genetic Programming", W. Banzhav, J. R. Koza et al, IEEE Intelligent Systems, Vol. 15, Issue 3, May-June 2000

In one embodiment of a semi-automated mode, a computing device 'proposes' a first fit preferably using one or more of the aforementioned fitting algorithms. The n proposed normal distribution functions are preferably derived by determining the most dominant peaks (with peak height and width) in the jitter histogram, preferably applying known peak analysis algorithms. The computing device may then graphically overlay the n proposed normal distribution functions over the determined jitter histogram. Since this (automated) fitting may not produce satisfying results in every case (especially in pathological cases with large amounts of noise), the user may then interactively change or 'correct' the approximation, e.g. by a manipulation of the characterizing values (mean, standard deviation, and relative weight) of each kernel, by using graphical tools to vary shape of each function, etc.

Without user intervention, the computer will apply the proposed approximation for determining the jitter value and/or the random jitter estimate or for further investigations. In case of a user intervention, the computer may accept the corrected approximation for determining the jitter value and/or the random jitter estimate or for further investigations. However, the computer may also execute further iterations to refine the approximation. A defined level of depth of accuracy will then limit the number of iterations.

In a specific embodiment, each proposed normal distribution function is characterized by a limited number of characteristic points, preferably three characteristic points such as one point at the maximum (at the mean value $M_n$) and two points representing the standard deviation $\sigma_n$. A modification of each distribution function is then only 'allowed' by modifying the characteristic points. Each proposed normal distribution function is preferably displayed by a graph of the function in "rubber-line" mode with the characteristic points being graphically emphasized. Preferably, the characteristic points are prominently displayed, e.g. as designated points, shapes, etc.

In an example with three characteristic points (at the maximum and two points representing the standard deviation $\sigma_n$), modifying (e.g. drawing at) the maximum point will alter the height and/or the mean value $M_n$ of a respective proposed normal distribution function, while modifying (e.g. dragging at) one of the standard deviation points will alter the width and thus the standard deviation of the respective proposed normal distribution function.

In one embodiment, the user can select a normal distribution function graph and drag/add it into the determined jitter histogram. The user may then manually fit the selected graph into the jitter histogram by varying its characteristic points. The computer will then further use this manually inserted/modified graph for the above-illustrated determinations.

The invention can be partly or entirely embodied or supported by one or more suitable software programs, which can be stored on or otherwise provided by any kind of data carrier, and which might be executed in or by any suitable data processing unit.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

FIG. 1 shows the right half of a bathtub curve for a Test Pattern Measurement;

FIG. 2 shows the corresponding jitter histogram for the Test Pattern Measurement;

FIG. 3 shows a jitter histogram fit according to the invention consisting of 5 distinct Gaussian kernels;

FIG. 4 shows the sum of the kernel of FIG. 3 together with the jitter histogram of FIG. 2;

DETAILED DESCRIPTION OF THE INVENTION

In a preferred embodiment for obtaining a jitter value (substantially representing the data-dependent or deterministic jitter amount) of a digital data signal to be measured, the following steps are executed using e.g. the aforementioned Agilent® 81250 ParBERT®:

1) A bathtub curve is determined for the digital data signal (e.g. a real-life signal or a test pattern such as a PRBS). Since both halves of the bathtub curve contain substantially the same jitter information, only the right side is considered (FIG. 1, with the x-axis denoting the delay time in unit intervals ui, and the y-axis denoting BER values). FIG. 2 shows the jitter histogram (in linear scale) derived from FIG. 1.

2) FIG. 3 shows an example of a multi-kernel Gaussian distribution fit for the histogram data of FIG. 2:

| Kernel# | Mean | Std. Dev. | Relative Weight |
|---------|--------|-----------|-----------------|
| 1 | 0.41 ui | 0.0123 ui | 0.4 |
| 2 | 0.45 ui | 0.0121 ui | 0.3 |
| 3 | 0.5 ui | 0.0124 ui | 0.5 |
| 4 | 0.54 ui | 0.0123 ui | 0.4 |
| 5 | 0.58 ui | 0.0122 ui | 0.2 |

FIG. 4 shows the sum of the determined kernels (straight line) as a reasonable approximation of the jitter histogram (dotted line) of FIG. 2.

3) (Optional) Let the user interactively change the approximation, either graphically (using modifiers to change the kernels in rubber-line mode, as shown for kernel No. 3 by the three points with arrows for in FIG. 3) or via numerical entries (directly entering mean, standard deviation and relative weight of the kernels).

4) Calculate a data/deterministic jitter value as the difference between the two outermost distribution's mean values. In the example here: 0.58 ui–0.41 ui=0.17 ui.

5) (Optional) Calculate the mean of the standard deviations of all distribution functions to get an estimate of the random jitter: 0.0123 ui.

Figure 5:
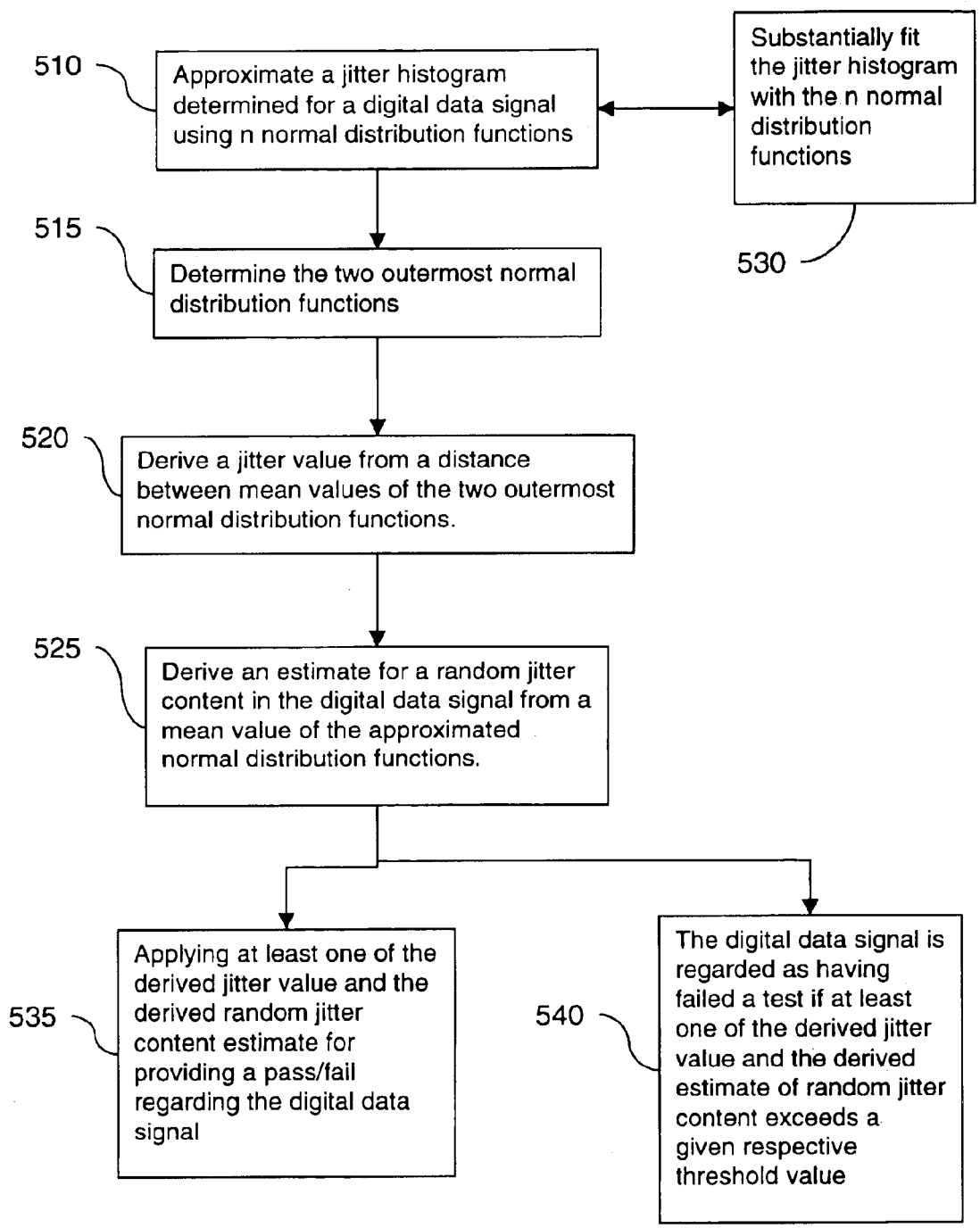
FIG. 5 shows a flow chart illustrating a method for determining a jitter value for a digital data signal in accordance with the present invention.

A flow chart illustrating a method for determining a jitter value for a digital data signal is shown own in FIG. 5. In block 510 a jitter histogram determined for the digital data signal is approximated using n normal distribution functions. Then, as shown in block 515, the two outermost normal distribution, functions are determined, and in block 520, the jitter value is derived from a distance between the mean values of the two outermost normal distribution functions. An estimate for a random jitter content in the digital data signal is derived from a mean value of the approximated normal distribution functions as shown in block 525.

The determination of the jitter hist gram in block 510 may include substantially fitting the jitter histogram with the n normal distribution functions as s own in block 530. In block 535, at least one of the determined jitter value and the determined random jitter estimate of block 525 are applied to provide a pass/fail regarding the digital data signal.

In block 540, (from 525) the digital data signal is regarded as having failed a test if at least one of the derived jitter value and the derived estimate of random jitter content exceeds a given respective threshold value.

Figure 6:
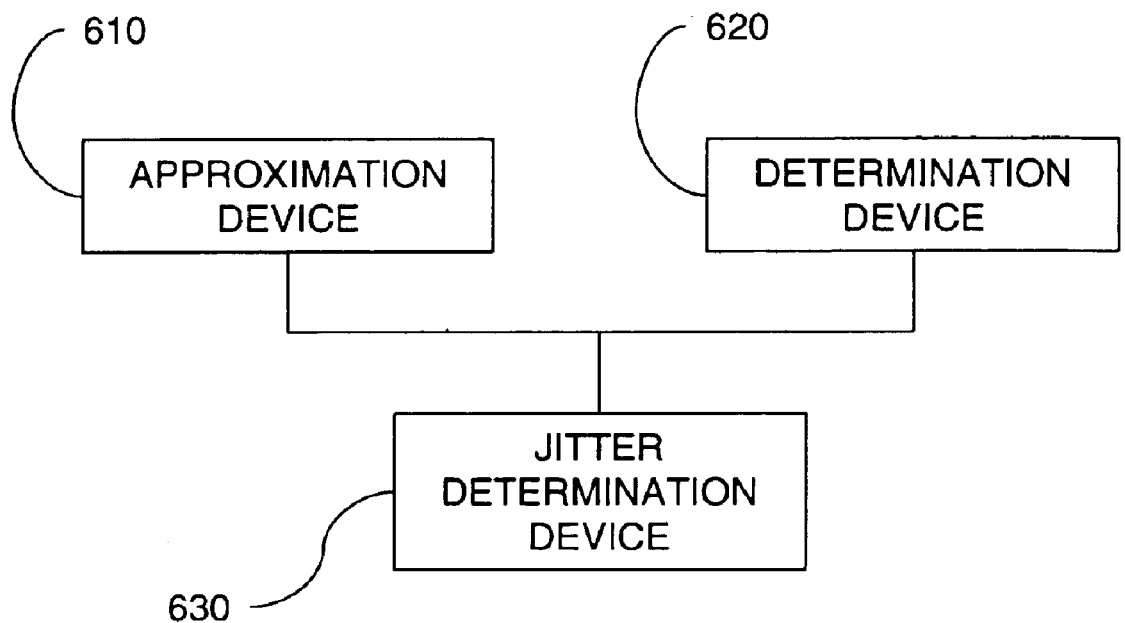
FIG. 6 shows a system for determining a jitter value for a digital data signal in accordance with the present invention.

A system for determining a jitter value for a digital data signal is illustrated in FIG. 6. The system includes an approximation device 610 adapted for approximating a jitter histogram determined for the digital data signal using n normal distribution functions. A determination device 620 is adapted for determining two outermost normal distribution functions of the n normal distribution functions, and a jitter determination device 630 is adapted for deriving the jitter value from a distance between mean values of the two outermost normal distribution functions.

What is claimed is:

1. A method for determining a jitter value for a digital data signal, the method comprising the steps of:
   (a) approximating a jitter histogram determined for the digital data signal using n normal distribution functions,
   (b) determining two outermost normal distribution functions of the n normal distribution functions, and
   (c) deriving the jitter value from a distance between mean values of the two outermost normal distribution functions.

2. The method of claim 1, further comprising a step of deriving an estimate for a random jitter content in the digital data signal from a mean value of the normal distribution functions.

3. The method of claim 1, wherein step (a) comprises a step of substantially fitting the jitter histogram with the n normal distribution functions.

4. The method of claim 2, wherein at least one of the derived jitter value and the derived estimate of random jitter content is applied for providing a pass/fail regarding the digital data signal.

5. The method of claim 2, wherein the digital data signal is regarded as having failed a test, if at least one of the derived jitter value and the derived estimate of random jitter content exceeds a given respective threshold value.

6. The method of claim 1, wherein the derived jitter value represents a deterministic jitter proportion of the digital data signal.

7. The method of claim 1, wherein step (a) comprises the step of:
   (a1) generating a proposed approximation of the jitter histogram,
   (a2) generating a modified proposed approximation of the jitter histogram, and
   (a3) selecting one of the proposed or the modified proposed approximation as the approximation for the steps (b) and (c).

8. The method of claim 7, further comprising a step prior to step (a3) of further refining the modified proposed approximation to the jitter histogram by iterating the steps of generating a proposed approximation of the jitter histogram and generating a modified proposed approximation of the jitter histogram until a defined level of accuracy of the modified propose approximation with respect to the jitter histogram is reached.

9. The method of claim 7, wherein in step (a3) the proposed approximation is selected when it has not been modified, and the modified proposed approximation is selected when the proposed approximation has been modified.

10. The method of claim 7, wherein in step (a2) the proposed approximation is modified by modifying at least one of a maximum, a mean value $M_n$ and a standard deviation $\sigma_n$ of at least one of the n normal distribution functions.

11. The method of claim 7, wherein in step (a) each of the n normal distribution functions is represented by three characteristic points with one point at a maximum of a mean value $M_n$ and two points representing a standard deviation $\sigma_n$.

12. A software program or product stored on a data carrier, having computer readable program code means for executing a method for determining a jitter value for a digital data signal when run on a data processing system, the method comprising;
   approximating a jitter histogram determined for the digital data signal using n normal distribution functions,
   determining two outermost distribution functions of the n normal distribution functions, and
   deriving the jitter value from distance between mean values of the two outermost normal distribution functions.

13. A system for determining a jitter value for a digital data signal, the system comprising:
   an approximation device adapted for approximating a jitter histogram determined for the digital data signal using n normal distribution functions,
   a determination device adapted for determining two outermost normal distribution functions of the n normal distribution functions, and
   a jitter determination device adapted for deriving the jitter value from a distance between mean values of the two outermost normal distribution functions.

* * * * *

UNITED STATES PATENT AND TRADEMARK OFFICE
CERTIFICATE OF CORRECTION

PATENT NO. : 6,931,335 B2  
APPLICATION NO. : 10/290594  
DATED : August 16, 2005  
INVENTOR(S) : Mueller It is certified that error appears in the above-identified patent and that said Letters Patent is hereby corrected as shown below:

In Column 5, line 27, Claim 2, delete "the" and insert -- the n --.

In Column 5, line 44, Claim 7, delete "step," and insert -- steps, --.

In Column 6, line 7, Claim 8, delete "propose," and insert -- proposed, --.

In Column 6, line 17, Claim 10, delete "$M_m$" and insert -- $M_m$, --

In Column 6, line 29, Claim 12, delete "comprising;" and insert -- comprising: --.

In Column 6, line 33, claim 12, after "outermost" insert -- normal --.

In Column 6, line 35, claim 12, after "from" insert -- a --.

Signed and Sealed this

Twenty-fourth Day of October, 2006

JON W. DUDAS  
*Director of the United States Patent and Trademark Office*